April 4, 1933.     H. E. KENNEDY     1,903,381
INTERNAL COMBUSTION ENGINE
Filed Sept. 23, 1932
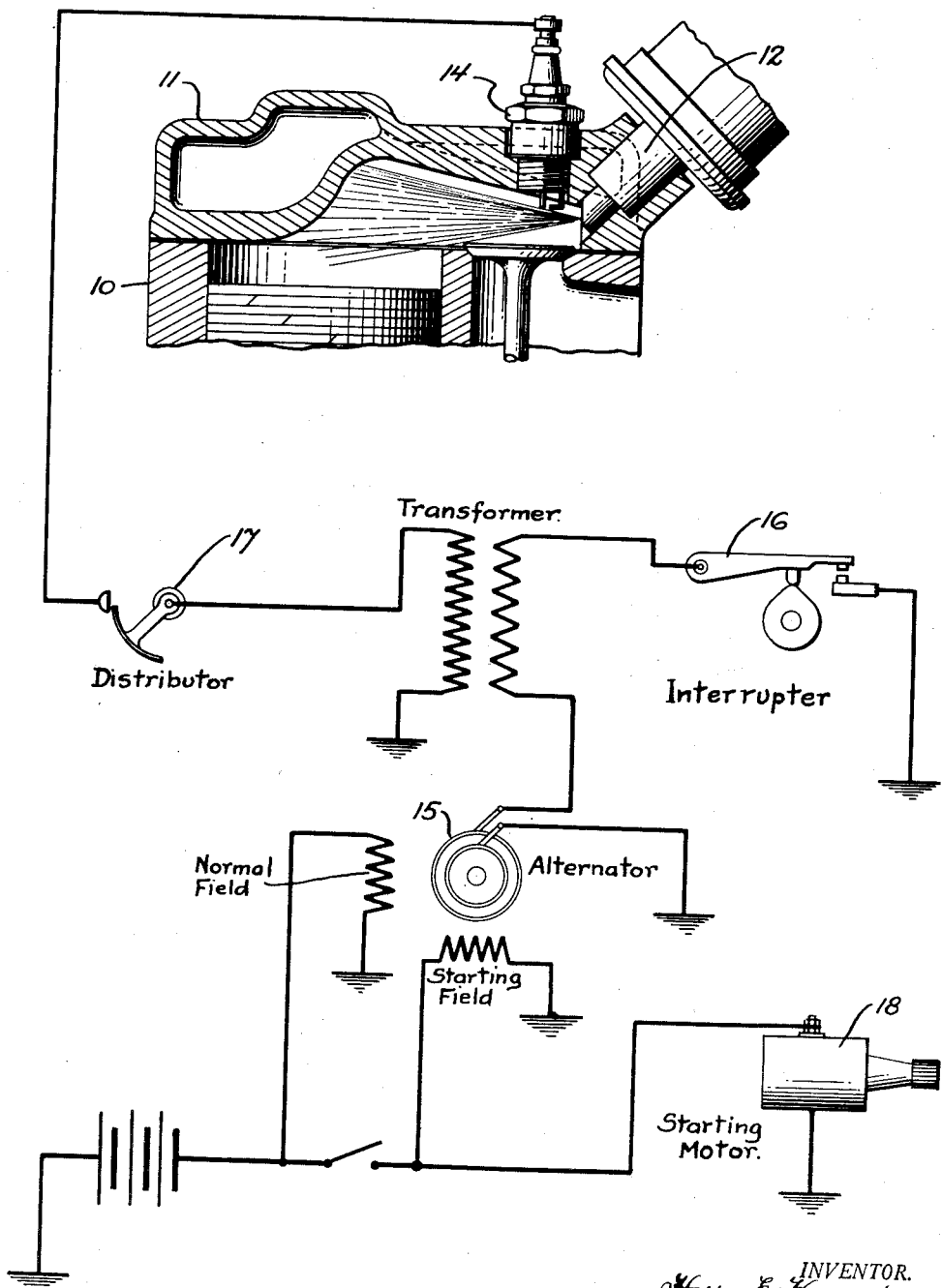
INVENTOR.
Harry E. Kennedy.
BY
Townsend and Loftus
ATTORNEYS.

Patented Apr. 4, 1933

1,903,381

UNITED STATES PATENT OFFICE

HARRY E. KENNEDY, OF BERKELEY, CALIFORNIA

INTERNAL COMBUSTION ENGINE

Application filed September 23, 1932. Serial No. 634,497.

This invention relates to a method of effecting combustion in an internal combustion engine.

Hitherto, the internal combustion motors which have been commercially successful may be divided into two general classifications. In the first class are the motors utilizing the highly volatile fuels such as gasoline or distillate, and wherein combustion is initiated by the passage of an electric spark through a homogeneous mixture of approximately correct proportions of fuel and air. In the ideal combustion sequence for a motor of this type, once combustion has been initiated, sufficient energy becomes available to raise the temperature, and consequently increase the chemical activity of the remaining mixture so that reaction proceeds evenly and progressively from the point of commencement until entirely complete. This ideal combustion sequence cannot be obtained if the compression ratio exceeds a definite value for the reason that upon the initiation of combustion, the pressure of the entire charge rises due to partial combustion and if the compression ratio exceeds a definite value, spontaneous ignition of the remaining fuel takes place with a severe detonation. This is one of the most serious limitations of this use of the volatile fuels and method of initiating combustion and has prompted endless research on fuels and antidetonating compounds.

In this same class of motors it was endeavored to produce a motor wherein a low grade of oil fuel was substituted for the more volatile fuels. In these motors the oil is vaporized prior to its admixture with the air, and the homogeneous charge of proper proportions of air and fuel is admitted to the cylinder, compressed and ignition initiated as previously described. These motors, however, have the same limitations as motors utilizing the more volatile fuels and in addition fail to produce the same power output throughout the same speed range as similar motors operating on a more highly volatile fuel. Consequently, these engines are suitable only in those fields where it is desired to sacrifice performance for fuel economy. This lack of efficiency is apparent when it is considered that the air must be metered in harmony with the fuel and that any throttling reduces cylinder charging.

In the second classification are the motors operating on the Diesel cycle which has become better known as compression ignition cycle. Compression ignition, of course, depends for its success in promoting chemical reaction upon producing sufficient temperature and concentration of the reacting substances by compression so as to initiate combustion. In compression ignition there is a delay or ignition lag between the beginning of fuel injection and ignition which is inherent to the kind or quality of fuel used. Some fuels ignite promptly at reasonable compression pressures and temperatures while others are difficult to ignite at any temperature and pressure. Oil fuel, of course, is a complex mixture of hydrocarbon compounds and varies as to its ignition properties.

The earlier motors utilizing compression ignition were of comparatively large bore and stroke and it has been only in comparatively recent years that attempts have been made to produce compression ignition motors of small bore and stroke for operation at comparatively high rotative speeds. These attempts have met with little success because as the bore and stroke decreases, the ratio of the surface of the combustion chamber to its volume increases. With this increase in surface to volume ratio, the cooling effect increases; thus, necessitating higher compression ratios in engines of small bore and stroke in order to produce by compression only, temperatures sufficiently high to ignite available fuels. This may be remedied to a slight extent by increasing the stroke bore ratio, but within practical limits the gain is not sufficient to make the small compression ignition engine feasible even when hot surfaces within the combustion space or preheating of the air are resorted to in order to facilitate ignition.

The problem of providing sufficiently high compression ratios in small bore and stroke motors to produce compression ignition is further complicated by the fact that the resulting clearance volume is so small that it is difficult, if not impossible, to provide valve clearance and yet provide a space of suitable shape in which to inject and atomize the fuel.

Another limitation of compression ignition is that even with a compression ratio of 17, ignition lag is such that speeds comparable to engines operating on the volatile fuels cannot be obtained. Therefore, motors operating on the compression ignition principle have been found inapplicable to those fields requiring comparatively small bore and stroke, light weight relative to power output, flexibility and a comparatively wide speed range. Likewise, this type of motor will not lend itself to production standards of the conventional type motors operated on carbureted mixtures with electrical ignition, for the reason that it must be constructed to withstand possible excessive pressures in the combustion chamber which may be created by pre-ignition.

It is the principal object of the present invention to provide a new method of effecting highly efficient combustion in the cylinder of an internal combustion motor, by which method ignition lag is rendered negligible and unaffected by the value of the compression pressure and the ratio of fuel to air in the charge, or the volatility of the fuel, and the combustion initiated and produced has the same characteristics throughout a wide range of compression pressures, thereby overcoming the limitations and disadvantageous characteristics of prior methods of initiating and producing combustion.

In practicing the invention, the cylinder of the motor is fully charged with air on the intake stroke of the piston and the fuel may be injected by solid or airless injection. An electric arc is created in proximity to the path of the fuel, preferably commencing prior to commencement of injection and terminating at the termination of injection. This arc is of an intensity and duration that its electrical and thermal influence is sufficient to dissociate the reacting substances of the air and fuel to an extent sufficient to initiate and produce efficient combustion. I have found that by this new method, a combustion can be created having the same characteristics irrespective of compression pressures within a wide range, and that ignition lag is negligible and unaffected to any degree whatsoever by either the compression pressure or ratio of fuel to air in the charge so that the motor will have flexibility and speed range comparing favorably with engines operating on highly volatile fuels. Thus, I am enabled to produce an engine operating on inexpensive oil fuels which in size and compression ratio may be such as to suit the field to which the engine is to be applied, which engine will favorably compare in performance to engines of similar size and weight operating on the highly volatile fuels.

The invention is exemplified in the following description and an engine for practicing the invention is illustrated by way of example in the accompanying drawing, in which:

The figure is a diagrammatic view of an engine for practicing my new method of initating and producing combustion in an internal combustion engine.

Referring to the drawing, I have diagrammatically illustrated an internal combustion motor which may be constructed according to production standards followed in constructing engines operating on carbureted mixtures. As motor construction of this character is conventional, it is unnecessary to illustrate and describe the same in detail. It will suffice to say that the motor includes the usual cylinder 10 fitted with a cylinder head 11 and formed with intake and exhaust ports communicating with intake and exhaust passages. In a multi-cylinder motor, the intake and exhaust passages may be connected with suitable manifolds. The intake and exhaust ports are, of course, controlled by intake and exhaust valves, which valves are operated in timed relation to the piston strokes through the medium of a cam shaft driven from the crank shaft of the motor as in conventional practice. The motor, of course, operates on the four-cycle principle with substantially the same timing between piston and valves as in conventional motors operating on carbureted mixtures.

The engine is fitted with an injection system including a spray valve 12 having its nozzle communicating with the combustion chamber at the top of the cylinder. The injection system is, of course, of the type creating what is known as solid or airless injection but may be of any preferred type wherein the spray valve is operated in properly timed relation to the piston strokes to inject a proper quantity of fuel into the combustion chamber.

In operation, the spray valve is preferably actuated to commence injection between thirty-five degrees and ten degrees before top center, depending upon speed. The duration of injection extends between two degrees and twenty-five degrees of crank angle. The duration, of course, varies with speed and quantity injected.

I may prefer to use an electrical injection system such as disclosed in my copending application, Serial No. 480,960, filed Sept. 10, 1931, and a spray valve such as described and illustrated in my Letters Patent of the United States, #1,892,956 issued Jan. 3rd, 1933. I find that this electrical injection system and valve is suitable for high speed work and ideally adapted to an engine of this character.

Also carried by the cylinder head and projecting into the combustion chamber is a spark plug 14 which may be of a standard design and construction. The terminals of this plug are interposed in the path of the fuel spray emanating from the spray valve orifice when the same is open for injection.

For creating the arc at the spark plug gap, the engine is equipped with an alternator driven from and in timed relation with the crank shaft of the motor. The field of the alternator may be derived from a battery or by means of permanent magnets. The output of the alternator is delivered into the primary of a step up transformer, one terminal of the secondary of the transformer being connected to the insulated terminal of the spark plug through the medium of a conventional high tension distributor 17, the other terminal of the secondary of the transformer being grounded. I prefer to interpose an engine actuated interrupter 16 in the primary circuit so as to interrupt the alternator current during the dormant period of the spark plug. The polar arrangement and armature winding of the alternator is such that a high tension arc is produced during the entire injection period and preferably commencing prior to the earliest possible point of injection and continuing until the termination of injection.

For starting purposes I have provided an electric starting motor 18 which is associated with the motor for starting the same in the conventional manner. In order to facilitate starting and obtain a vigorous arc during the operative period of the starting motor, a subsidiary winding is provided producing an additional magneto-motive force in the magnetic circuit of the alternator, which subsidiary winding is arranged so as to be energized during the operation of the starting motor. This subsidiary winding may be either in parallel with the starter or carry the entire starting current, and the additional flux produced compensates for the relatively low speed of rotation of the alternator during starting.

The characteristic of an alternator driven at variable speeds is to generate an electromotive force proportional to speed. However, if the electromotive force is impressed upon an inductive receiving circuit, such as the one in question, the current will remain constant for the entire speed range for the reason that the impedance of a circuit varies directly with the frequency. The secondary voltage, of course, would continuously increase with speed were it not limited by the gap between the spark plug terminals.

It should be stated that the high tension arc created as above described is maintained for a relatively long duration of crank angle and, therefore, it is present throughout the entire duration of injection regardless of the variations of advance and retard which may be necessary for a wide speed range.

The arc which I produce in the combustion chamber may be likened to the type of arc used in nitrogen fixation furnaces and the function of the arc in my method of producing combustion is to be distinguished from that of the spark in initiating combustion in the conventional type motors operating on volatile fuels and mixtures of chemically correct proportions of fuel and air. This latter spark is of exceedingly short duration, there being only that energy liberated which may be stored in the magnetic circuit of a relatively small induction coil. Such a spark will only ignite a nearly chemically correct vaporous mixture but a high tension arc, such as I utilize, is capable of producing profound chemical transformation in the combustion chamber.

I have found that when the current in an electrical discharge taking place in air at a given pressure exceeds a certain value, the character of the discharge seems to undergo a gradual but distinct change. With a few milliamperes the spark is blue and stringy with a characteristic snapping noise, but when the current is increased, a profound change incurs. The transition point, however, is not pronounced, as there is a gradual increase of flame and a reduction of snapping. This flame has all the characteristics of combustion and very conceivably is nitrogen burning in oxygen. I have discovered that an electrical discharge of this character in proximity to a fuel jet and in the presence of air causes instantaneous combustion either at atmospheric or at any other pressure. Consequently, when an unvaporized charge in the combustion chamber is subjected to such an arc, combustion will ensue regardless of compression pressures, thus enabling my method to be employed in motors of widely different compression ratios.

It appears that this high tension arc, due to its intensity and duration, supplies sufficient electrical and thermal energy to disrupt the oxygen molecule in the air of the charge in proximity to the arc into atomic oxygen which, during its recombination in contact with fuel particles, produces oxidation.

It is well known that when a diatomic gas, such as hydrogen or oxygen, is passed through a high tension arc, the molecule is disrupted into atomic form. Thus, hydrogen passed through an arc is disrupted into atomic hydrogen, which subsequently recombines. The energy liberated during this recombination equals that energy required to dissociate it, and the temperature created during such recombination exceeds that of the oxyacetylene flame.

In common with atomic hydrogen, it seems probable that the atomic oxygen requires a surface upon which to recombine. Therefore, when the high tension arc is created in the cylinder in proximity with the fuel and air, the atomic oxygen probably recombines on the surface of the fuel particles as injected where its energy is released and violent oxidation promoted. In accordance with this, the combustion is controlled by the rate of injection and is not influenced by the pressure rise created by piston action or partial combustion. Also, the ignition lag will be negligible and will not be influenced either by the proportions of fuel and air in the charge or the pressures created by the piston action.

In view of this, it is manifest that the compression ratio within, of course, maximum limits may be selected by the designer as the combustion will have the same characteristics throughout a wide range of compression pressures.

It is also obvious that combustion by my method is not preceded by vaporization and this is evident from the fact that in actual practice the engine will start cold during the first half revolution with injection commencing as late as top center. Further, ignition does not depend upon mixture strength because I have proven by actual test that with a constant quantity of fuel injected, the air may be throttled to a considerable degree without interference with regular firing.

In operation of the engine, it is started by the use of a starting motor as in standard practice. A full charge of air is withdrawn into the cylinder upon the intake stroke and after the piston commences the compression stroke and preferably prior to commencement of injection, a circuit is completed through the spark plug to create the high tension arc as described. At the proper point or between thirty-five degrees and ten degrees before top center, the spray valve is opened and injection commences. Of course, the passage of the arc at the lower cylinder pressures serves to ionize the gap for the ready passage of the arc occurring during injection and at the higher pressures.

As previously described, the arc is of an intensity and duration that its electrical and thermal influence is sufficient to dissociate the reacting substances of the air and fuel to an extent sufficient to initiate and produce efficient combustion. That is to say, that due to the presence of the high tension arc, the oxygen molecule is dissociated during its passage through the arc, and due to the presence of the fuel oil, which is a readily oxidizable material, a very vigorous and prompt reaction results.

In actual practice, I have constructed a four-cylinder four-cycle motor wherein the bore is three and three quarters inches and the stroke four and one-half inches, the compression ratio being approximately five and three-quarters. This motor is conventional in design throughout with the exception, of course, of the combustion chamber and the injection and ignition systems. I have found that in this motor I am able to produce forty horsepower at 2500 R. P. M., forty-four horsepower at 3250 R. P. M. and fifty horsepower at 4000 R. P. M. The fuel employed was what is known as Diesel fuel oil of twenty-seven degrees plus gravity. This engine has a speed range from approximately 250 R. P. M. to a speed exceeding 4000 R. P. M. and from all tests made it is evident that efficient combustion takes place throughout the entire speed range and that the engine has great flexibility and fast pick up at all speeds.

Tests were also run on this engine with a combustion chamber suitable for the efficient use of gasoline as a fuel and comparative tests clearly indicate that the performance and output of the engine operating on my improved method of initiating and producing combustion exceeds the performance and output of the engine operating on gasoline.

While I have described and illustrated the invention as practiced with a four-cycle motor, it will be apparent to those skilled in the art that my method of combustion may be just as readily applied to two-cycle engines.

From the foregoing it is also manifest that my improved method of combustion can be used throughout a wide range of compression pressures and that due to the fact that the ignition lag is negligible, a motor employing my method of initiating and producing combustion will have flexibility and a speed range favorably comparing with those motors utilizing highly volatile fuels.

While I have described my invention in detail, it is to be understood that various changes may be made therein by those skilled in the art without departing from the spirit of the invention as defined in the appended claims.

Having thus described my invention, what I claim and desire to secure by Letters Patent is:

1. A method of combustion used in starting and operating an internal combustion engine which comprises fully charging the cylinder thereof with air drawn from the atmosphere during the intake stroke, injecting unvaporized fuel into the cylinder, creating a high tension and high energy arc in the cylinder prior to commencement of the injection and terminating approximately coincident therewith, said arc being of sufficient intensity to create sufficient energy in the cylinder to ignite the unvaporized fuel during the injection thereof.

2. A method of combustion used in starting and operating an internal combustion engine which comprises fully charging the cylinder thereof with air during the intake stroke of the piston in the cylinder, injecting the unvaporized fuel into the cylinder during the compression stroke prior to the end of said stroke, and creating a high tension and high energy arc directly in the path of the fuel entering the cylinder during the compression stroke, said arc commencing prior to commencement of injection and enduring until cessation of injection.

3. A method of combustion used in starting and operating an internal combustion engine which comprises fully charging the cylinder thereof with air during the intake stroke of the piston in the cylinder, injecting fuel in spray form into the cylinder during the compression stroke prior to the end of said stroke, creating a high tension and high energy electrical arc in the cylinder directly in the path of the spray, said arc commencing prior to commencement of injection and enduring until cessation of injection, said arc being of sufficient intensity to create sufficient energy to complete ignition at approximately the end of the compression stroke.

4. A method of combustion used during starting and operating an internal combustion engine, wherein the final temperature of the charge is below that degree which results in spontaneous ignition, which method consists in charging the cylinder with air during the intake stroke of the piston in the cylinder, injecting liquid fuel in unvaporized form into the cylinder, and subjecting the contents of the cylinder during the entire injection period to the action of a high tension, high energy electrical arc.

5. A method of combustion used during starting and operating an internal combustion engine, wherein the final temperature of the charge is below that degree which results in spontaneous ignition, which method consists in charging the cylinder with air during the intake stroke of the piston in the cylinder, injecting liquid fuel in unvaporized form into the cylinder, and subjecting the contents of the cylinder during the entire injection period to the action of a high tension, high energy electrical arc created by alternating electrical current.

6. A method of combustion used in starting and operating an internal combustion engine which consists in fully charging the cylinder thereof with air during the intake stroke, injecting unvaporized fuel oil directly into the cylinder during the compression stroke prior to the end of said compression stroke and exposing the reacting substances in the cylinder content to the dissociating influence of a high tension and high energy electrical arc present throughout the entire duration of the injection.

7. A method of combustion used in starting and operating an internal combustion engine which consists in fully charging the cylinder thereof with air during the intake stroke of the piston in the cylinder, injecting liquid fuel directly into the cylinder during the compression stroke and prior to the end of the compression stroke and subjecting the content of the cylinder to the action of a high tension and high energy arc present throughout the entire period of injection and interposed in the path of the fuel entering the cylinder, said arc being of sufficient intensity and energy to dissociate the oxygen content in the cylinder and thereby effect ignition.

8. A method of combustion used in starting and operating an internal combustion engine which consists in fully charging the cylinder thereof with air during the intake stroke, injecting unvaporized liquid fuel into the cylinder during the compression stroke and during a period immediately prior to the end of the compression stroke and subjecting the cylinder content throughout the entire duration of injection to a high tension, high energy electrical arc created by alternating electrical current, said arc being of sufficient intensity to create sufficient energy to dissociate the oxygen molecules adjacent the arc into atomic oxygen and thereby effect ignition.

9. A method of combustion used in starting and operating an internal combustion engine, which consists in fully charging the cylinder thereof with air during the intake stroke of the piston in the cylinder, injecting fuel into the cylinder during the compression stroke during the period immediately prior to the end of the compression stroke, the fuel being injected in a direction perpendicular to the path of travel of the piston, and subjecting the cylinder content to the action of a high tension, high energy arc interposed in the path of the injected fuel prior to and throughout the entire duration of injection, said arc being of an intensity creating sufficient energy to dissociate oxygen and thereby effect ignition.

10. A method of combustion for use in starting and operating an internal combustion engine which consists in charging the cylinder with air, injecting unvaporized fuel into the cylinder in a direction at right angles to the path of piston travel and subjecting the cylinder content to the dissociating electrical and thermal influence of a high tension, high energy electrical arc disposed in the path of the injected fuel and present throughout the entire duration of injection.

11. A method of combustion used in starting and operating an internal combustion engine which consists in creating a charge of air and unvaporized fuel in the combustion chamber thereof and subjecting the said charge to the electrical and thermal influence of an electrical arc high in intensity and energy and of comparatively long duration, said arc being of sufficient intensity and energy to dissociate the oxygen molecules of the charge adjacent the arc into atomic oxygen and thereby effect ignition.

12. A method of combustion used in starting and operating an internal combustion engine which consists in creating a charge of air and unvaporized fuel particles in the cylinder and subjecting said charge to the dissociating electrical and thermal influence of a high tension and high energy electrical arc created by alternating electrical current.

13. A method of combustion used during starting and operation of an internal combustion engine which comprises fully charging the cylinder thereof with air during the intake stroke, injecting unvaporized liquid fuel into the cylinder, creating a high tension, high energy electrical arc in the cylinder in the path of the fuel during injection, said arc being present throughout the entire duration of injection and being sufficient in intensity and energy to form atomic oxygen and thereby minimize ignition lag.

HARRY E. KENNEDY.